United States Patent [19]

Preneel et al.

[11] Patent Number: 5,664,016
[45] Date of Patent: Sep. 2, 1997

[54] METHOD OF BUILDING FAST MACS FROM HASH FUNCTIONS

[75] Inventors: Bart K. B. Preneel, Heverlee, Belgium; Paul C. Van Oorschot, Ottawa, Canada

[73] Assignee: Northern Telecom Limited, Montreal, Canada

[21] Appl. No.: 544,150

[22] Filed: Oct. 17, 1995

Related U.S. Application Data

[60] Provisional application No. 60/000,545, Jun. 27, 1995.

[51] Int. Cl.$^6$ ............................................. H04L 9/00
[52] U.S. Cl. ..................................... 380/28; 380/29
[58] Field of Search ................................. 380/28, 29, 30, 380/23, 25, 49

[56] References Cited

U.S. PATENT DOCUMENTS

| | | | |
|---|---|---|---|
| 4,078,152 | 3/1978 | Tuckerman III | 380/37 |
| 4,322,576 | 3/1982 | Miller | 380/29 |
| 5,420,928 | 5/1995 | Aiello et al. | 380/462 |
| 5,483,598 | 1/1996 | Kaufman et al. | 380/43 |

OTHER PUBLICATIONS

Preneel et al., "MDx–MAC and Building Fast MACs from Hash Functions", Katholieke Universiteit Leuven, Dept. Electrical Engineering–ESAT, (1995) pp. 1–14.

Krawczyk, "LFSR–based Hashing and Authentication", Advances in Cryptology, Proc. Crypto '94, LNCS 839, Y. Desmedt, Ed., Springer–Verlag, (1994), pp. 129–139.

Rivest, "The MD4 Message Digest Algorithm", Advances in Cryptology, Proc. Crypto '90, LNCS 537, S. Vanstone, Ed., Springer–Verlag, (1991), pp. 303–311.

Rivest, "The MD5 Message Digest Algorithm", Request for Comments (RFC) 1320, Intenet Activities Board, Internet Privacy Task Force, (1991), pp. 1–22.

"Race Integrity Primitives Evaluation (RIPE–RACE 1040): Final Report," LNCS volume, Springer–Verlag, (to appear), pp. 71–112.

"Proposed Revision of FIPS 180, Secure Hash Standard", Federal Register, (1994), pp. 1–22.

B. den Boer et al., "An Attack on the Last Two Rounds of MD4", Advances in Cryptology, Proc. Crypto '91, LNCS 576, J. Feigenbaum, Ed., Springer–Verlag, (1992) pp. 194–203.

Vaudenay, "On the Need for Multipermutations: Cryptanalysis of MD4 and SAFER", Research Repport of LIENS–94–23, Ecole Normale Superieure, Paris, (1994), pp. 1–6.

B. den Boer, "Collisions for the Compression Function of MD5", Advances in Cryptology, Proc. Eurocrypto '93, LNCS 765, T. Helleseth, Ed., Springer–Verlag, (1994), pp. 293–304.

*Primary Examiner*—Thomas H. Tarcza
*Assistant Examiner*—Pinchus N. Laufer
*Attorney, Agent, or Firm*—Foley & Lardner

[57] ABSTRACT

Hash functions are important in modern cryptography. Main applications are their use in conjunction with digital signature schemes and message authentication. Hash functions, commonly known as message authentication codes (MACs), have received widespread use in practice for data integrity and data origin authentication. New and inventive ways of building fast MACs from hash functions involve keyed hash functions in which secret keys are used at certain locations of the compression process and the keys are also hashed.

25 Claims, 4 Drawing Sheets

METHOD OF BUILDING FAST MACS FROM HASH FUNCTIONS

CROSS REFERENCE TO RELATED APPLICATION

This application claims the benefit of U.S. Provisional application Ser. No. 60/000,545, filed 27 Jun. 1995.

FIELD OF THE INVENTION

The invention resides generally in the field of message authentication in digital transaction through computer networks. In particular, it is directed to a keyed hash function and a method of building message authentication codes (MACs) by using such a hash function. The MACs thus generated are very secure and resistant to various known attacks.

BACKGROUND OF THE INVENTION

Hash functions play a fundamental role in modern cryptography. One main application is their use in conjunction with digital signature schemes; another is in message authentication. As shown in FIG. 1, a hash function is a function that maps bitstrings of arbitrary finite length (message X) into strings of fixed (usually small) length (e.g. 64 or 128 bits), called hash-values. In practical applications, the hash-value corresponding to a particular input is computed at some point in time. The integrity of this hash-value is then protected in some manner. At a subsequent point in time, to verify the input data has not been altered, the hash-value is recomputed, using purportedly the same input, and compared for equality to the original hash-value. The basic idea is that a hash-value serves as a compact representative image (sometimes called a digital fingerprint, or message digest) of the input string, and can be used as if it were uniquely identifiable with that string. The problem of checking the integrity of the potentially large original input is reduced to verifying that of a small, fixed-size hash-value. Hash functions always have the problem of collision, i.e. pairs of inputs which hash to the same output because of many-to-one mappings. The objective, however, is to define hash functions for which finding pairs of inputs which collide is computationally in-feasible in practice. Hash functions may or may not involve secret parameters (keys). A hash function must satisfy the following properties:

1. pre-image resistance: it is computationally infeasible to find any input which hashes to any pre-specified output.
2. second pre-image resistance: it is computationally infeasible to find any second input which has the same output as any specified input.

For an ideal one-way hash function with an n-bit result, finding a pre-image or a second pre-image requires $O(2^n)$ operations. A collision resistant hash function is a one-way hash function that satisfies an additional condition:

3. collision resistance: it should be "hard" to find a collision, i.e. two distinct inputs that hash to the same result.

In the field of message authentication, it is preferable that a hash function take as a distinct secondary input a secret key. Such hash functions, commonly known as message authentication codes (MACs), have received widespread use in practice for data integrity and data origin authentication, e.g. in banking applications.

Compared to the extensive work on the design and analysis of hash functions, little attention has been given to the design of efficient MAC algorithms. One apparent reason is that the first proposals for MAC algorithms were quickly turned into standards and proved adequate in practice. The first constructions are based on the Cipher Block Chaining (CBC) and Cipher FeedBack (CFB) modes of a block cipher. Most standards and applications use the CBC mode. Another proposal dating back to 1984 is the Message Authenticator Algorithm (MAA) for which no significant weaknesses have been identified. The inventors of the present application identify weaknesses in MAA in an article entitled "MDx-MAC and Building Fast MACs from Hash Functions" to be published in the Proceedings of Crypto '95 in August 1995. The article also describes the present invention which addresses these problems. MAA is a current ISO standard, and is relatively fast in software. Its main disadvantage is that the result, being 32 bits, is considered unacceptably short for many applications. Recent research on authentication codes has resulted in very fast, scalable, and information theoretically secure constructions, which require relatively short keys, as described in "LFSR-based hashing and authentication," by H. Krawczyk in Advances in Cryptology, Proc. Crypto '94, LNCS 839, Y. Desmedt, Ed., Springer-Verlag, 1994, pp. 129–139. The disadvantage is that a different key must be used for every message. If this is not acceptable, one can generate the key using a cryptographically strong pseudo-random string generator, but the resulting scheme is then (at most) computationally secure.

Several years ago, R. L. Rivest proposed two very fast hash functions, namely MD4 and MD5 in "The MD4 message digest algorithm," Advances in Cryptology, Proc. Crypto '90, LNCS 537, S. Vanstone, Ed., Springer-Verlag, 1991, pp. 303–311 and "The MD5 message-digest algorithm," Request for Comments (RFC) 1320, Internet Activities Board, Internet Privacy Task Force, April 1992. Later RIPEMD and SHA were introduced by other research groups respectively in "Race Integrity Primitives Evaluation (RIPE-RACE 1040): Final Report" LNCS volume, Springer-Verlag, to appear and in "Proposed Revision of FIPS 180, Secure Hash Standard," Federal Register, Jul. 11, 1994. In software, these hash functions may be as much as one order of magnitude faster than DES. Several factors have motivated their adoption as the basis for "makeshift" MAC algorithms: system designers quickly realized that MACs based on these outperform other available options; the additional implementation effort required to use these as MACs is very small; and the fact that such MACs do not involve encryption algorithms has favorable export implications. Because of such factors, MAC constructions based on these hash functions, including the "secret key prefix", "secret key suffix", and "envelope" methods have been proposed and used in practice.

SUMMARY OF THE INVENTION

Briefly stated, the invention resides in an iterated hash function operation in data encryption and authentication. According to one aspect it is directed to a method of performing a compression function $H_i = f(H_{i-1}, X_i)$ to an input data block $X_i$ having a plurality of data segments $X_i[j]$, each data segment being of a predetermined bitlength of p, p being a positive integer and $H_i$ being an updated chaining variable of $H_{i-1}$. The compression function comprises multiple iterated internal steps and each internal step comprises a preparing step of introducing working variables to a data segment, a keying step of introducing a subkey $K_1$ to a predetermined constant to generate a key dependent constant, and a processing step of treating the prepared data segment with the key dependent constant.

In a further aspect, the invention resides in a method of generating a message authentication code for message X which comprises steps of dividing X into $X_i$ data blocks, i=1 to t and t being an integer, each data block being a predetermined number of bits long and data block $X_t$ having padding bits if needed. The method comprises a step of generating data block $X_{t+1}$ of the predetermined number of bits long under a subkey $K_2$ and appending data block $X_{t+1}$ to data block $X_t$. The method further includes a step of iteratively performing a compression function $H_i=f(H_{i-1}, X_i)$ to data blocks $X_i$ for i=1 to t+1 to generate a n-bit chaining variable $H_i$, each data block having p-bit data segments $X_i[j]$, p being a positive integer and $H_i$ being an updated chaining variable of $H_{i-1}$, the compression function comprising multiple iterated internal steps in that each internal step comprises: a preparing step of introducing working variables to a data segment, and a keying step of introducing a subkey $K_1$ or a portion thereof to a predetermined constant y to generate a key dependent constant. The internal step further includes a processing step of treating the prepared data segment with the key dependent constant. The method further includes a step of transforming the final chaining variable $H_{t+1}$ to an m-bit final output $g(H_{t+1})$, which is the message authentication code for message X, where m and n are positive integers and m≦n.

DETAILED DESCRIPTION OF PREFERRED EMBODIMENTS OF THE INVENTION

As mentioned earlier, a MAC is a hash function with a secondary input, the secret key K. Given h, an input x, and the secret key K, computing h(x) must be easy. It is assumed here that K is an implicit parameter of h(x). The strongest condition one may impose on a MAC is that for someone who does not know the secret key, it be computationally infeasible to perform an existential forgery, i.e. to find an arbitrary message and its corresponding MAC. This should be contrasted to a selective forgery, where an opponent can determine the MAC for a message of his choice. Here it is assumed that the opponent is capable of performing a chosen text attack, i.e. may obtain MACs corresponding to a number of messages of his choice. A stronger notion is an adaptive chosen text attack, in which his requests may depend on the outcome of previous requests. To be meaningful, a forgery must be for a message different from any for which a MAC was previously obtained.

For an ideal MAC, any method to find the key is as expensive as an exhaustive search of $O(2^k)$ operations for a k-bit key. The number of text-MAC pairs required for verification of such an attack is k/m, where m is a bitlength of the hash result. An opponent who has identified the correct key can compute the MAC for any message (i.e. key recovery allows selective forgery). If the opponent knows no text-MAC pairs, or if m<k, his best strategy may be to simply guess the MAC corresponding to a chosen message; the probability of success is $\frac{1}{2^m}$. The disadvantage of a guessing attack is that it is not verifiable. A further desirable property of an ideal MAC is that finding a second preimage should require $O(2^m)$ known text-MAC pairs. In some settings, e.g. multi-destination electronic mail, it may be desirable that this requires $O(2^m)$ off-line MAC computations even for someone who knows the key.

Most hash functions, including MACs, are designed as iterative processes which hash inputs of arbitrary length by processing successive fixed-size b-bit blocks of the input. The input X is preprocessed and is divided into t blocks $X_1$ through $X_t$. The preprocessing involves padding etc., such that if the total length is not a multiple of b, the input is padded using an unambiguous padding rule.

Figure 1:
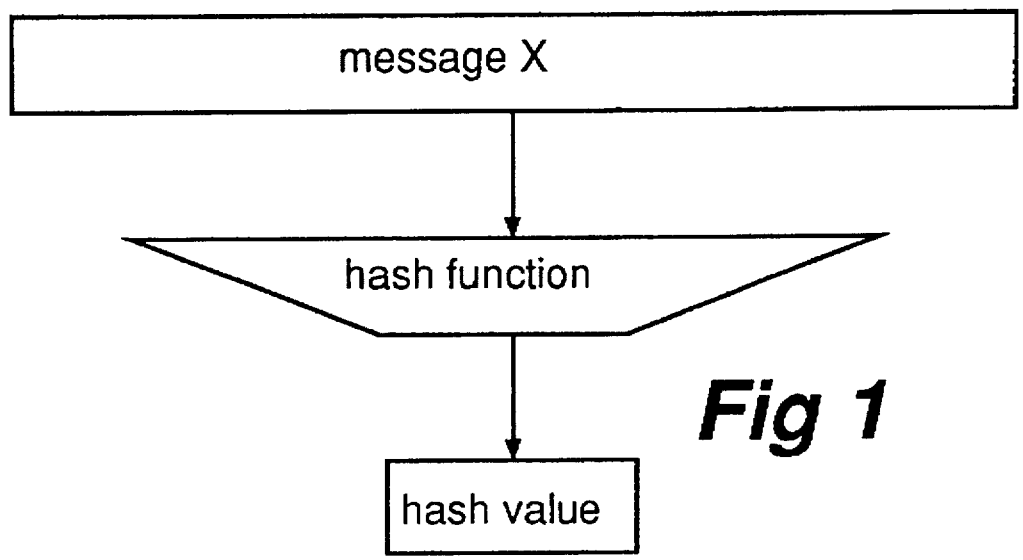
FIG. 1 is a brief functional diagram of a hash function.
Figure 2:
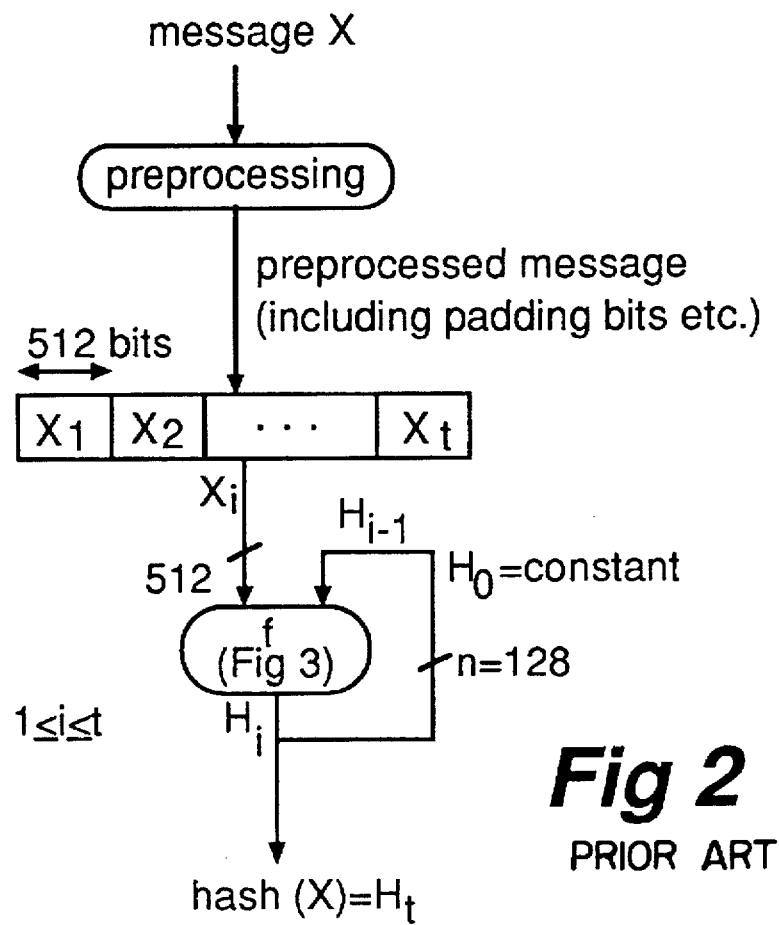
FIG. 2 functionally shows a process of building a MAC according to prior art.
Figure 3:
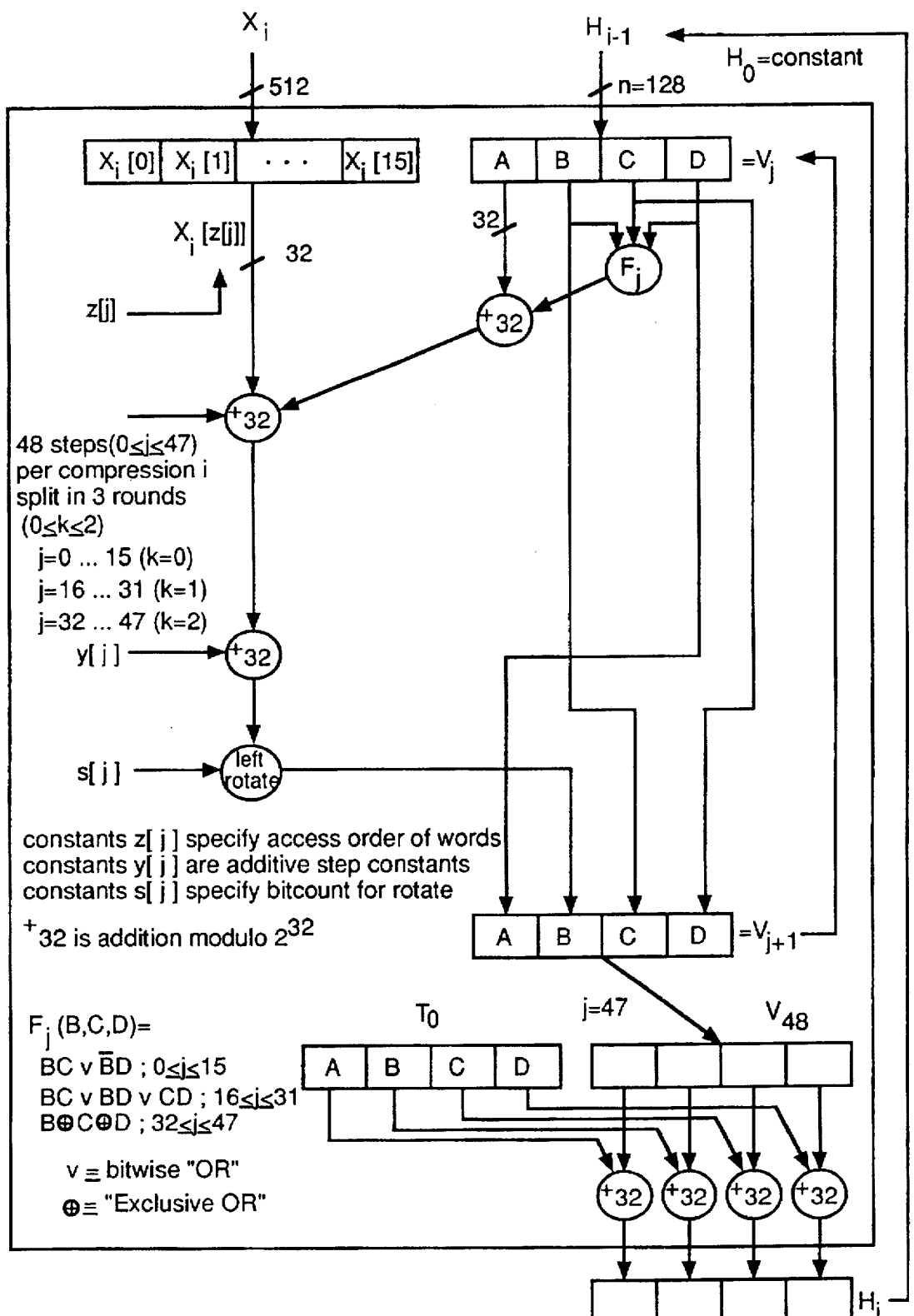
FIG. 3 is a functional diagram of a compression function of the prior art.

The hash function h is an iterated process and can be described as follows:

$H_0$=IV (initialization value); $H_i=f(H_{i-1}, X_i), 1 \leq i \leq t$; $h(X)=H_t$ Here f is the compression function of h, and $H_i$ is the chaining variable between stage i−1 and stage i with bitlength n (n≧m). In FIG. 2, one example (MD4) of iterated hash functions is illustrated. In FIG. 2, a message X of an arbitrary length is preprocessed and divided into t blocks of 512 bits each. Each block $X_1, X_2, X_3, \ldots$, is iteratively passed through a compression function f, starting with a constant initialization value $H_0$. FIG. 3 shows in detail the compression function f used in this example.

By referring to FIGS. 2 and 3, a detailed description of MD4 is given below.

The following notation is used for 32-bit quantities u, v, w, x:

"+": addition modulo $2^{32}$ $\bar{u}$: bitwise complement of u uv, u∨v, and u⊕v: bitwise AND, inclusive-OR, exclusive-OR $f(u, v, w)=uvv \ \bar{u}w$; $g(u, v, w)=uvv \ uw \lor vw$; $h(u, v, w)=u \oplus u \oplus w$ "x<<s": result of rotating x left through s positions INPUT: bitstring x of arbitrary bitlength b≧0.

OUTPUT: 128-bit hash-code of x.

1. Definition of constants. Define four 32-bit initial chaining values (IVs), in hex: $h_1$=0x67452301, $h_2$=0xefcdab89, $h_3$=0x98badcfe, $h_4$=0x10325476.

Define additive constants, in hex:

y[j]=0, 0≦j≦15;

y[j]=0x5a827999, 16≦j≦31;

y[j]=0x6ed9eba1, 32≦j≦47.

Define order for accessing source words:

z[0 ... 15]=[0,1,2,3,4,5,6,7,8,9,10,11,12,13, 14,15], z[16 ... 31]=[0,4,8,12,1,5,9,13,2,6,10,14,3,7,11,15], z[32 ... 47]=[0,8,4,12,2,10,6,14,1,9,5,13,3,11,7,15].

Finally define the number of bit positions for left shifts (rotates):

s[0 ... 15]=[3,7,11,19,3,7,11,19,3,7,11,19,3,7,11,19], s[16 ... 31]=[3,5,9,13,3,5,9,13,3,5,9,13,3,5,9,13], s[32 ... 47]=[3,9,11,15,3,9,11,15,3,9,11,15,3,9,11,15].

2. Preprocessing. Pad x such that its bitlength is a multiple of 512, as follows. Append a single 1-bit, then append r−1 (≧0) 0-bits for the smallest r resulting in a bitlength 64 less than a multiple of 512. Finally append the 64-bit representation of b mod $2^{64}$, as two 32-bit words with least significant word first. Let m be the number of 512-bit blocks in the resulting string (b+r+64=512m=32*16m). The formatted input consists of 16 m 32-bit words: $x_0 x_1 \ldots x_{16m-1}$. Initialize: $H_1:=h_1, H_2:=h_2, H_3:=h_3, H_4:=h_4$.

3. Processing. For each i from 0 to m−1, copy the jth block of 16 32-bit words into temporary storage: $X[j]:=x_{16i+j}$, $0 \leq i < 15$, and process these as follows.
(initialise working variables) $A:=H_1$, $B:=H_2$, $C:=H_3$, $D:=H_4$.
(execute three rounds of 16 steps, then update; t is a temporary variable) For j from 0 to 15 do the following (Round 1):

$$t:=(A+f(B,C,D)+X[z[j]]+y[j]), A:=D, D:=C, C:=B, B:=(t<<s[j]).$$

For j from 16 to 31 do the following (Round 2):

$$t:=(A+g(B,C,D)+X[z[j]]+y[j]), A:=D, D:=C, C:=B, B:=(t<<s[j]).$$

For j from 32 to 47 do the following (Round 3):

$$t:=(A+h(B,C,D)+X[z[j]]+y[j]), A:=D, D:=C, C:=B, B:=(t<<s[j]).$$

(update chaining values) $H_1:=H_1+A$, $H_2:=H_2+B$, $H_3:=H_3+C$, $H_4:=H_4+D$.

4. Completion. The final hash-value is the concatenation: $H_1$ $H_2$ $H_3$ $H_4$.

In the case of a MAC, one often applies an output transformation g to $H_t$ to obtain the hash-result, i.e. $h(x)=g(H_t)$. The size of the hash-result in bits will be denoted by m where $m \leq n$. For example, in the CBC-MAC, the output transformation g consists of selecting the leftmost m bits. In general the secret key can be introduced in the IV, in the compression function f, and in the output transformation g.

The present inventors have studied and concluded as shown in the above mentioned article to be published that extreme care must be exercised in constructing a MAC from a hash function. The following points must be observed:

1. The secret key should be involved at the beginning, at the end, and in every iteration of the hash function, while minimizing modifications to internal gained in (to preserve trust previously gained in the underlying compression function).
2. The deviation from the original hash function should be minimal (to minimize implementation effort and maximize on experience and confidence previously gained).
3. The performance should be close to that of the hash function.
4. The additional memory requirements should be minimized (keeping smart card implementations in mind).
5. The approach should be generic, i.e. should apply to any hash function based on the same principles as MD4.

Figure 4:
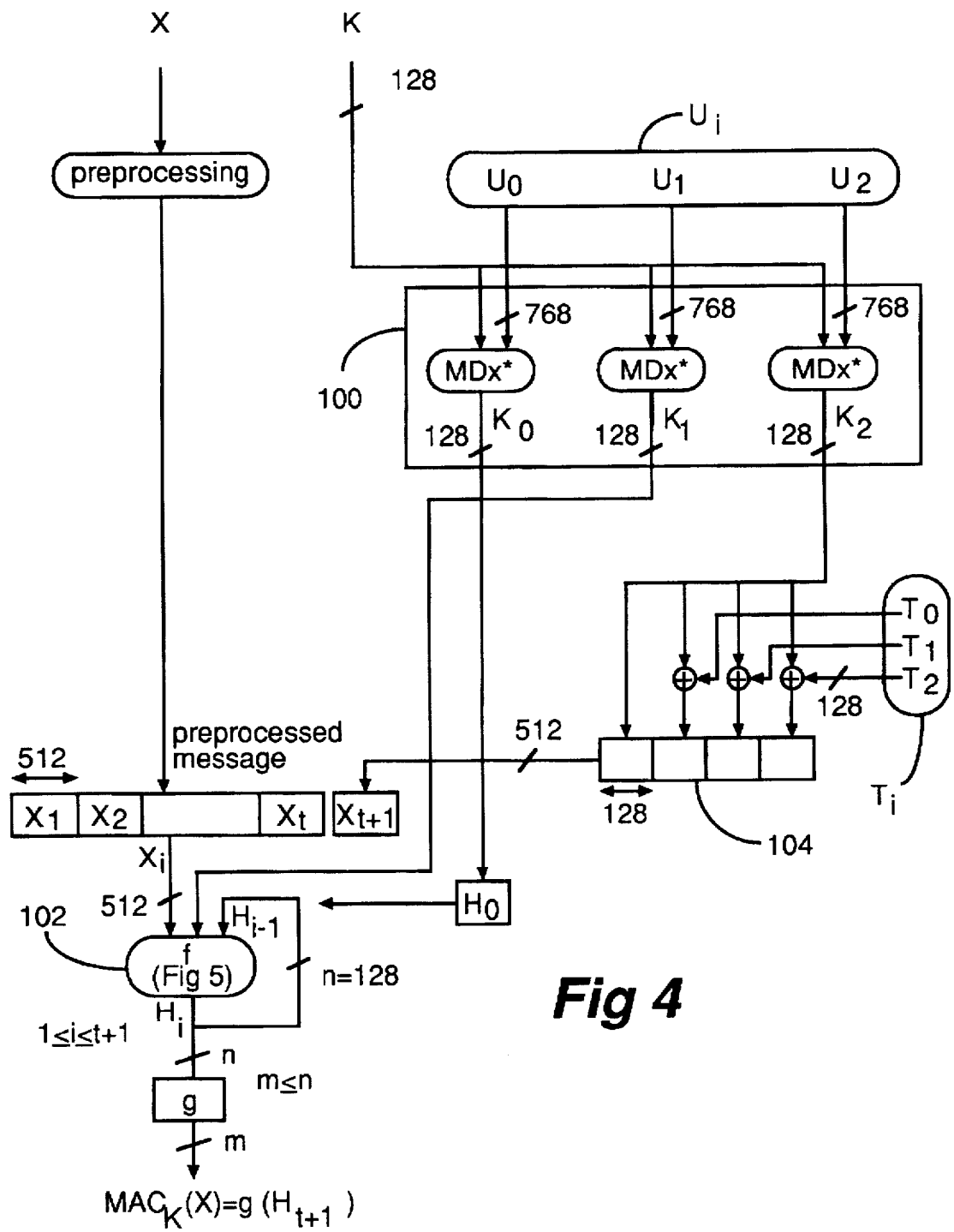
FIG. 4 functionally shows a process of building a MAC according to one embodiment of the invention.
Figure 5:
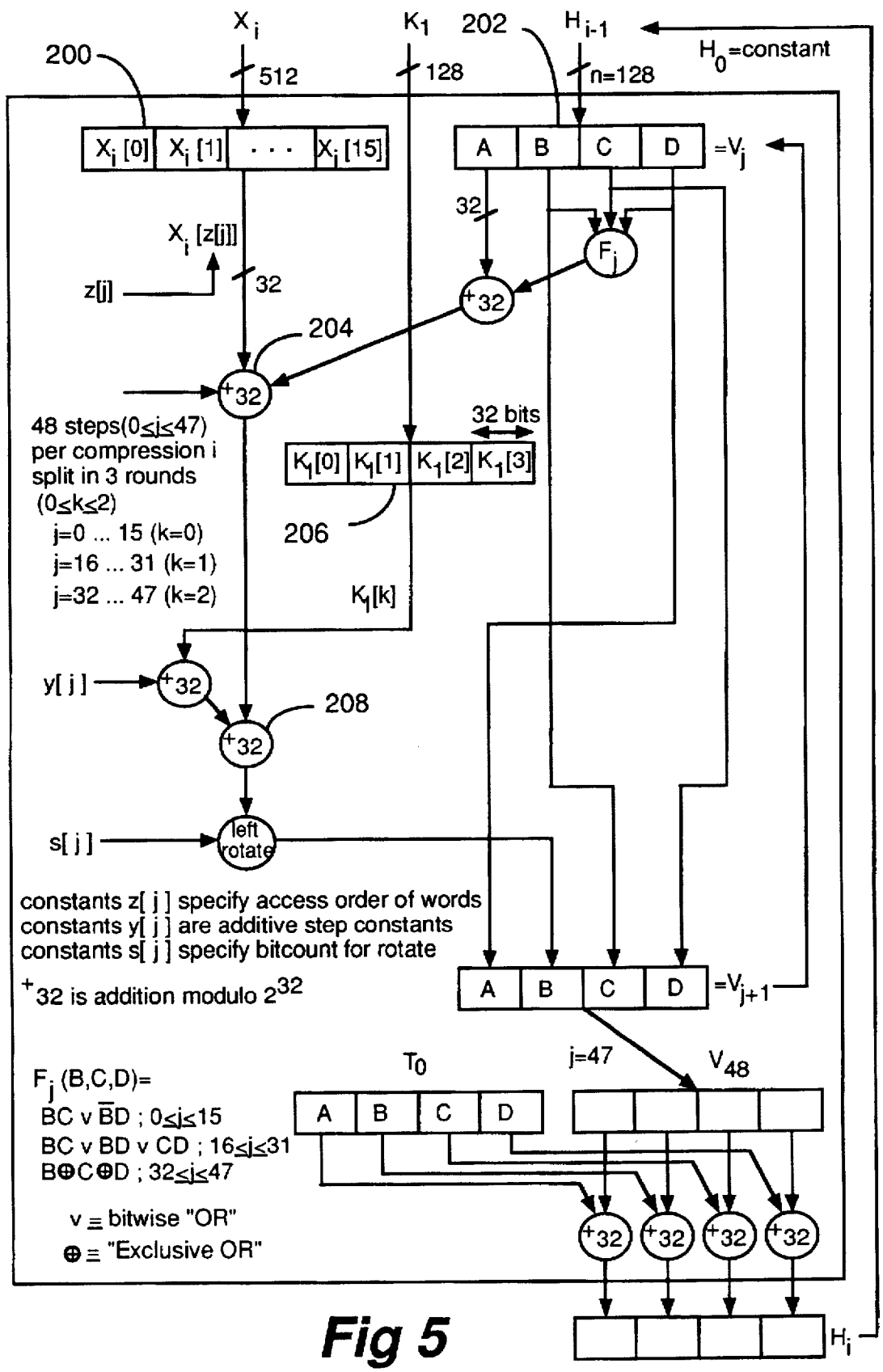
FIG. 5 is a functional diagram of a compression function according to one embodiment of the invention.

Referring to FIGS. 4 and 5, embodiments of the invention are described in detail. It should be noted that many different embodiments with different bitlengths, other parameters and so on can be designed to suit particular needs.

According to this embodiment, the new algorithm converts the hash function MDx into the MAC MDx-MAC with a 128-bit key K as a secondary input. It should be noted that the key K can be any size up to 128 bits in length. If K is shorter than 128 bits, concatenate K to itself a sufficient number of times, and select the leftmost 128 bits. Here MDx may be MD5, RIPEMD, or SHA or any similar hash function which is secure. While structurally applicable, MD4 itself is omitted from this recommendation because of weaknesses identified in "An attack on the last two rounds of MD4" by B. den Boer et al in Advances in Cryptology, Proc. Crypto '91, LNCS 576, J. Feigenbaum, Ed., Springer-Verlag, 1992, pp.194–203, and more recently in "On the need for multipermutations: cryptanalysis of MD4 and SAFER," by S. Vaudenay in Research Report of LIENS-94-23, Ecole Normale Supérieure, Paris, November 1994.

In FIG. 4, the algorithm uses three 16-byte predetermined constants $T_i$ ($0 \leq i \leq 2$). Let MDx* denote algorithm MDx with both padding and appended length omitted. These constants are used to form other three predetermined constants in the form of 96-byte strings $U_i$ ($0 \leq i \leq 2$). The computation of $T_i$ involves the 62-byte constant R="ab . . . yzAB . . . 89" and 2-byte constants $S_i$ ($0 \leq i \leq 2$). Here $S_i$ is the 16-bit string consisting of repeating twice the 8-bit hexadecimal representation of the number i (e.g. $S_i$=3131 hex)

for i:=0 to 2 $T_i$:=MDx*($S_i$||R) (for SHA, leftmost 16 bytes thereof)

for i:=0 to 2 $U_i$:=$T_i$ ||$T_{i+1}$ ||$T_{i+2}$ ||$T_i$ ||$T_{i+1}$ ||$T_{i+2}$ where the subscripts of T are taken modulo 3. The constants $T_i$ and $U_i$ are fixed for all time, given MDx (e.g. MDx= MD5 ). The ways of forming the constants above are given as an example.

The first run-time step is key expansion at 100. The 16-byte secret key K is expanded to three 16-byte (or for SHA, 20-byte) subkeys $K_0$, $K_1$, and $K_2$:

for i:=0 to 2 $K_i$:=MDx*(K ||$U_i$ ||K).

The derived key $K_i$ (or for SHA, the leftmost 16 bytes of thereof) is split into four 32-bit substrings denoted $K_i[k]$ ($0 \leq k \leq 3$).

MDx-MAC is then obtained by modifying MDx (e.g. for MDx=MD4, MD4-MAC as shown in FIG. 4) as follows:

1. The initial value IV (=$H_0$) of MDx is $K_0$ which is generated from a main key K and a predetermined constant $U_0$.
2. $K_1$ [i mod 4] is added mod $2^{32}$ to the additive constants which are used in round i of each iteration of MDx. FIG. 5 illustrates this compression function 102 in detail. For RIPEMD the rounds in the two independent iterations are numbered 0–2 and 3–5 respectively. For MD5 and SHA, the rounds are 0–3.
3. Following the block containing the padding and appended length as defined by MDx (i.e. the last block after normal postprocessing), an additional complete 64-byte block is appended which has the following form 104:

$$K_2||K_2 \oplus T_0||K_2 \oplus T_1||K_2||T_2.$$

4. The leftmost m bits of the output are used, $m \leq n$. In one of the preferred embodiments, m=n/2

Referring to FIG. 5, compression function f is illustrated in detail which comprises multiple compression steps e.g. 48 which are split in 3 rounds. As will be apparent, compression function f of the present invention is similar to the compression function used in MD4 shown in FIG. 3. In FIG. 5, each data block $X_i$ is divided into 16 32-bit data segments $X_i[0, \ldots, 15]$ at 200. Meanwhile as described above, the initial value IV(=$H_0$=$K_0$) is split into four 32-bit substrings ABCD at 202 which are individually processed as shown. The result is added mod $2^{32}$ to a data segment at 204. Subkey $K_1$ is split to substrings $K_1[0]$, $K_1[1]$, $K_1[2]$ and $K_1[3]$ of 32 bits each at 206. A substring is added mod $2^{32}$ to the predetermined additive constant y[j] and then added mod $2^{32}$ further to the processed data segment at 208.

The computational overhead of the MAC construction is 6 block operations for the key expansion (2 for each $K_i$); a single block operation is required for each 64 bytes of message input. Estimates indicate that MD5-MAC is 5–20% slower than MD5. For RIPEMD and SHA, the performance difference is smaller. The additional storage requirements are 16 bytes for K, 48 bytes for the $T_i$, and 16 bytes for $K_2$;

$K_0$ may be computed when required, and $K_1$ may be added immediately to the constants. The interpretation of strings as integers is defined to match that used in MDx.

The idea of the construction of the constants $T_i$ is to obtain "random" bit strings which are easy to compute if an implementation of MDx is available (as opposed to the inconvenient constants of $\sqrt{2}$ and $\sqrt{3}$ in MD4, and the sine constants in MD5). The $U_i$ are defined in terms of the $T_i$ which implies that it is sufficient to store 48 bytes to define the three 96-byte strings $U_i$. Any other truly random constants $T_i$ or $U_i$ would serve equally well from a security perspective, but might be less convenient in practice (e.g. with respect to storage requirements). The key expansion makes use of two compression functions: this is intended to make it very hard to go from any of the $K_i$ back to K. (If only a single iteration were used, a cryptanalyst could remove the feedforward in MDx, which would reduce the strength.) The three derived keys $K_0$, $K_1$, and $K_2$ are computed from K by applying a one-way function, implying that even if two of the three values are known, one has no information on the third. Also, the relation between these derived keys is hard to predict. Note that the mapping from K to $K_i$ is not bijective. The expected reduction in entropy for each $K_i$ is, however, negligible.

The use of $K_0$ and $K_2$ as specified prevents a divide-and-conquer attack on the key space.

The use of $K_1$ in MDx-MAC also improves security over the so-called "envelope method". The simple use of the iteration-invariant $K_1$ is not very strong by itself: for MD5 and RIPEMD this is almost equivalent to an offset in the message (it would be equivalent if a message word would have the same offset in each round). However, it is very hard to find a collision for an unknown value of $K_0$, and the addition of $K_1$ yields an additional complication. Moreover, an exhaustive search for each of these values is as computationally difficult as an exhaustive search for K. The advantage of this approach is that it minimizes the difference between MDx and MDx-MAC, reducing the probability of introducing new weaknesses.

If the bitsize n of the chaining variable is twice that of the MAC output (i.e. n=2m), MDx-MAC is demonstrably more secure than the envelope method. Furthermore, unlike the envelope method, MDx-MAC is not susceptible to the divide and conquer key search attack. Moreover, the key size of 128 bits gives a better idea of the actual strength of MDx-MAC than the 640 bits previously proposed for the envelope method. The new scheme is also stronger against attacks exploiting the internal structure of MDx.

Although it was shown in "Collisions for the compression function of MD5", Advances in Cryptology, Proc. Eurocrypto '93, LNCS 765, T. Helleseth, Ed., Springer-Verlag, 1994, pp. 293–304 that the compression function of MD5 is not collision resistant, it is not expected that this weakness results in a weakness of MD5 -MAC. The collision for the compression function implies that two values of $K_0$ are equivalent. However, these two values are extremely likely to correspond to unrelated values of $K_1$ and $K_2$, implying they are of little help to an attacker.

In accordance with another embodiment, m for SHA can be any value and most likely to be selected to be one of 160, 128, 80 and 64 in practice. It should also be mentioned that for SHA a more natural construction might be to use a 160-bit key K, construct subkeyS Ki of the same length, and make appropriate modifications. However, a 128-bit key appears adequate against all plausible key search attacks, and as defined (with n=2m=160), the forgery attack against SHA-MAC requires about $2^{80}$ chosen text-MAC pairs and $2^{80}$ known texts. Note that the corresponding numbers of known and chosen texts for MD5-MAC and RIPEMD-MAC are about $2^{64}$.

What is claimed is:

1. In an iterated hash function operation in data encryption and authentication, a method of performing a compression function $H_i=f(H_{i-1}, X_i)$ to an input data block $X_i$ having a plurality of data segments $X_i[j]$, each data segment being of a predetermined bitlength of p, p being a positive integer and $H_i$ being an updated chaining variable of $H_{i-1}$, the invention being characterized in that the compression function comprises multiple iterated internal steps, and each internal step comprises:

(i) a preparing step of introducing working variables to a data segment;

(ii) a keying step of introducing a subkey $K_1$ or a portion thereof to a predetermined constant y to generate a key dependent constant; and (iii) a processing step of treating the prepared data segment with the key dependent constant.

2. The method according to claim 1, wherein the keying step (ii) and/or the processing step (iii) comprise a step of involving one or more arithmetic or logical functions, including a modulo addition or the like.

3. The method according to claim 2, wherein the initial value $H_0$ of the chaining variable is dependent on a subkey $K_0$, further comprising steps of generating subkeys $K_0$ and $K_1$ by the use of other hash functions to a main key K and predetermined constants $U_0$ and $U_1$ respectively.

4. In a method of generating a message authentication code for a message X which comprises steps of dividing X into $X_i$ data blocks, i=1 to t and t being an integer, each data block being a predetermined number of bits long and data block $X_t$ having padding bits if needed, the invention being characterized in further steps of:

(a) generating a data block $X_{t+1}$ of the predetermined number of bits long under a subkey $K_2$;

(b) appending data block $X_{t+1}$ to data block $X_t$;

(c) performing iteratively a compression function $H_i=f(H_{i-1}, X_i)$ to data blocks $X_i$ for i=1 to t+1 to generate an n-bit chaining variable $H_i$, each data block having p-bit data segments $X_i[j]$, p being a positive integer and $H_i$ being an updated chaining variable of $H_{i-1}$, the compression function comprising multiple iterated internal steps in that each internal step comprises:

(i) a preparing step of introducing working variables to a data segment, (ii) a keying step of introducing a subkey $K_1$ or a portion thereof to a predetermined constant y to generate a key dependent constant, and (iii) a processing step for treating the prepared data segment with the key dependent constant; and (d) transforming the final chaining variable $H_{t+1}$ to an m-bit final output $g(H_{t+1})$, which is the message authentication code for message X, where m and n are positive integers and m≦n.

5. The method according to claim 4, wherein the keying step (ii) and/or the processing step (iii) comprise a step of involving one or more arithmetic or logical functions, including a modulo addition or the like.

6. The method according to claim 5 wherein the keying step (ii) involves a step of introducing the predetermined constant y of p bits long and a p-big portion of subkey $K_1$, the latter of which has been generated by a first subkey function using a main key K of k bits, k being an integer, and a predetermined constant $U_1$.

7. The method according to claim 6 whereto the initial value $H_0$ of the chaining variable is dependent on a subkey $K_0$ and comprising further steps of generating an initial chaining variable $H_0$ under subkey $K_0$ and generating subkey $K_0$ by the use of a second subkey function, to the main key K and a predetermined constant $U_0$.

8. The method according to claim 7 comprising further steps of generating data block $X_{t+1}$ under subkey $K_2$ and a predetermined constant T and generating subkey $K_2$ by the use of a third subkey function, to the main key K and a predetermined constant $U_2$.

9. The method according to claim 8 wherein the third subkey function is a hash function.

10. The method according to claim 9 wherein the hash function of the third subkey function is selected from a group consisting of any iterated hash function based on MD4 or of similar structure to MD4, including MD5, RIPEMD and SHA.

11. The method according to claim 10 wherein the hash function of the third subkey function is SHA, n=160 and m≦160.

12. The method according to claim 11 wherein m is one of 160, 128, 80 and 64.

13. The method according to claim 10 wherein the main key K has k bits where k≦128.

14. The method according to claim 8 where m=n and g is a permutation or the identity function.

15. The method according to claim 8 where m=n/2.

16. The method according to claim 7 wherein the second subkey function is a hash function.

17. The method according to claim 7 wherein the first and the second subkey functions are the same.

18. The method according to claim 8 wherein any two or three of the first, second and third subkey functions are the same.

19. The method according to claim 6 wherein the first subkey function is a hash function.

20. The method according to claim 19 wherein the hash function is selected from a group consisting of any iterated hash function based on MD4 or of similar structure to MD4, including MD5, RIPEMD and SHA.

21. The method according to claim 20 wherein the hash function is SHA, n=160 and m≦160.

22. The method according to claim 21 wherein m is one of 160, 128, 80 and 64.

23. The method according to claim 20 wherein the main key K has k bits where k≦128.

24. The method according to claim 4 where m=n and g is a permutation or the identity function.

25. The method according to claim 4 where m=n/2.

* * * * *